United States Patent [19]

Mink

[11] Patent Number: 4,492,512

[45] Date of Patent: Jan. 8, 1985

[54] AMPLIFIED MOTION TRANSMITTING DEVICE

[76] Inventor: George Mink, 37900 Mound Rd., Sterling Heights, Mich. 48077

[21] Appl. No.: 326,552

[22] Filed: Dec. 2, 1981

[51] Int. Cl.³ .............................................. B66C 23/00
[52] U.S. Cl. ................................ 414/744 A; 414/735
[58] Field of Search ................... 414/735, 744 R, 740, 414/744 A, 222, 223, 225, 226; 198/774

[56] References Cited

U.S. PATENT DOCUMENTS 3,719,270  3/1973  Budris et al. ..................... 198/774
4,027,767  6/1977  Gluck ........................... 414/744 R X

FOREIGN PATENT DOCUMENTS 2046201  11/1980  United Kingdom ................ 414/735

OTHER PUBLICATIONS

"Ferguson Parts Handlers", Ferguson Machine Comp., 1975, Bulletin No. H-75B.

*Primary Examiner*—Robert J. Spar
*Assistant Examiner*—Donald W. Underwood
*Attorney, Agent, or Firm*—Harness, Dickey & Pierce

[57] ABSTRACT

A material handling device including gripping means for gripping and moving a workpiece along linear and angular paths from a first location to a second location. First and second cam and follower arrangements generate defined amplitudes of movement in particular degrees of freedom, and linear and angular movement mechanisms are operative to transfer movement in these degrees of freedom into movement of the gripping means and the workpiece along the linear and angular paths. A sector gear transmission is interposed in the operative connection between the linear movement mechanism and its associated cam and follower arrangement for amplifying the amplitude of movement generated by the cam and follower for transfer by the linear movement mechanism into an enlarged amplitude of movement of the gripping means and the workpiece along the linear path.

8 Claims, 5 Drawing Figures

AMPLIFIED MOTION TRANSMITTING DEVICE

BACKGROUND OF THE INVENTION

The present invention relates to material handling devices, and more particularly, to an improved device for moving workpieces which achieves large amplitudes of movement by way of a relatively compact movement mechanism.

Numerous workpiece moving applications require a material handling device which is utilized to move a workpiece through large amplitudes of movement from one location to another. While many devices exist for gripping a workpiece at one location, moving it to another location and thereafter releasing it, adapting such devices to accomplish large amplitudes of movement would require movement generating elements of relatively large size. On the other hand, limited space environments often dictate the need for a material handling device of relatively compact size, so that prior known devices possess inherent disadvantages in such applications.

It is, therefore, desirable to provide a material handling device which can achieve large amplitudes of workpiece movement without requiring an enlargement of the associated movement generating elements and their containment housing. It is also desirable to provide such a material handling device which is of a relatively compact size and is particularly suited for use in limited space situations.

SUMMARY OF THE INVENTION

The material handling device of the present invention operates to move a workpiece along first and second paths to effect movement of the workpiece from a first location to a second location. The device includes gripping means for gripping a workpiece to be moved, a first cam and follower arrangement for generating a defined amplitude of movement in a first degree of freedom, and a first motion transfer means for transferring movement in the first degree of freedom into movement of the gripping means along the first path. The device also includes a second cam and follower arrangement for generating a defined amplitude of movement in a second degree of freedom, and a second motion transfer means for transferring movement in the second degree of freedom into movement of the gripping means along the second path. A relatively compact transmission means is interposed in the operative connection between one of the cam and follower arrangements and the motion transfer means associated therewith which multiplies the amplitude of movement in the degree of freedom generated by that cam and follower arrangement to yield a different amplitude of output movement in the same degree of freedom. This output movement is accordingly transferred by the associated motion transfer means into movement of the gripping means along the associated path.

The transmission means can therefore enable movement of the gripping means and the workpiece gripped thereby through larger amplitudes of movement without an associated increase in the size of the movement generating elements. The present invention thus provides a material handling device which can achieve a large degree of workpiece movement without requiring substantial additional housing space, and thus yields a relatively compact material handling device particularly suited for large workpiece movement applications.

The above and other features of the invention will become apparent from a reading of the detailed description of the preferred embodiment which makes reference to the following set of drawings.

DETAILED DESCRIPTION OF THE PREFERRED EMBODIMENT

Figure 1:
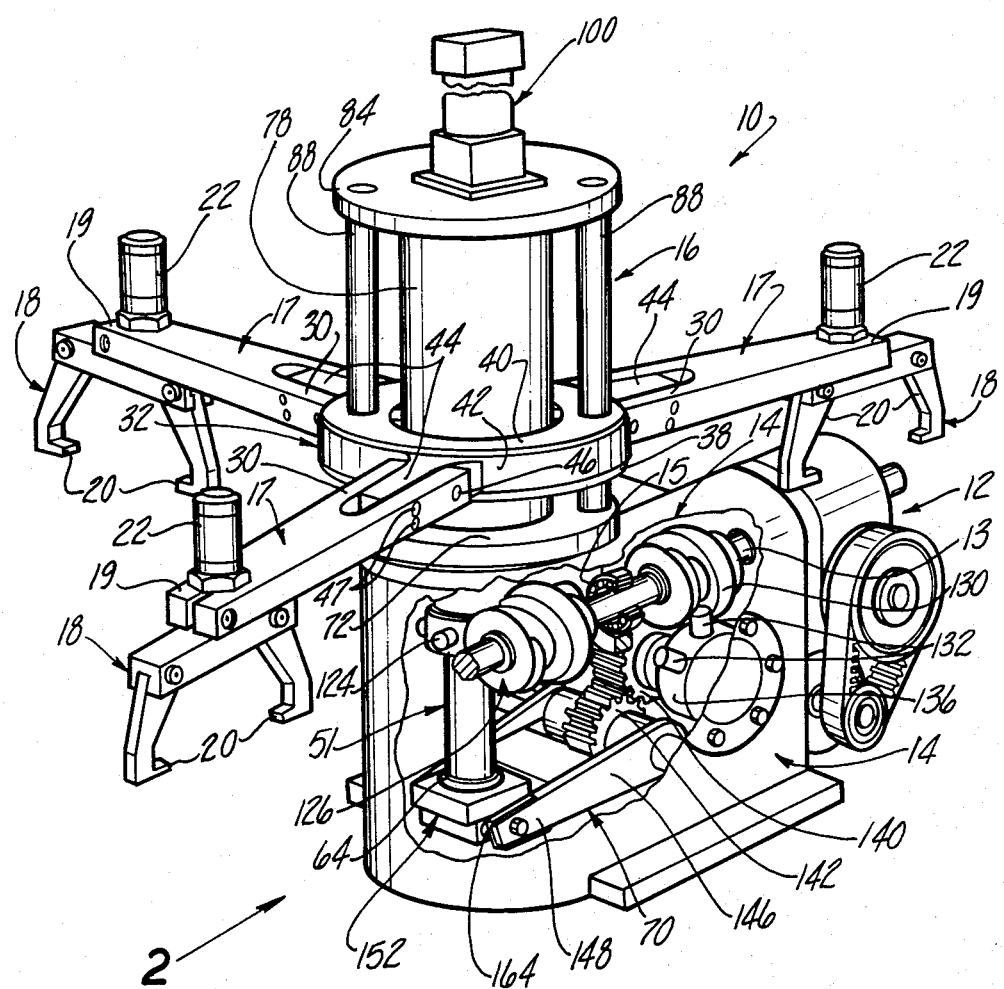
FIG. 1 is a perspective view of a material handling device in accordance with the present invention, with portions broken away to more clearly show its construction.

Referring now to the drawings, a material handling device in accordance with the present invention is shown generally in FIG. 1 at 10. The device 10 includes a driving motor 12 which is operative to drive a camshaft 13 journaled within a housing 14 by spaced bearings, one of which is shown at 15, and cam and follower arrangements disposed within housing 14. Retained for movement above housing 14 is a supporting structure 16 and three identical supporting arms 17, each of which supports a workpiece gripping device 18 for movement. The workpiece gripping devices 18 may be of any of the known types of devices generally available on the market, and are affixed in any desirable orientation at the other ends 19 of supporting arms 17. Each workpiece gripping device 18 includes a pair of pivotal jaws 20 which are actuated between an opened, released position and a closed, gripping position, by means of an actuating cylinder 22. As shown in FIG. 1, the inner end of each supporting arm 17 defines a bifurcated portion 30 which is retained for movement with a disc assembly 32 in a manner described more fully below. As will become apparent, the elements of the device 10 are constructed so that each workpiece gripping device 18 is moved along predetermined linear and angular paths so that workpieces may be moved thereby from a first location to a second location.

Figure 2:
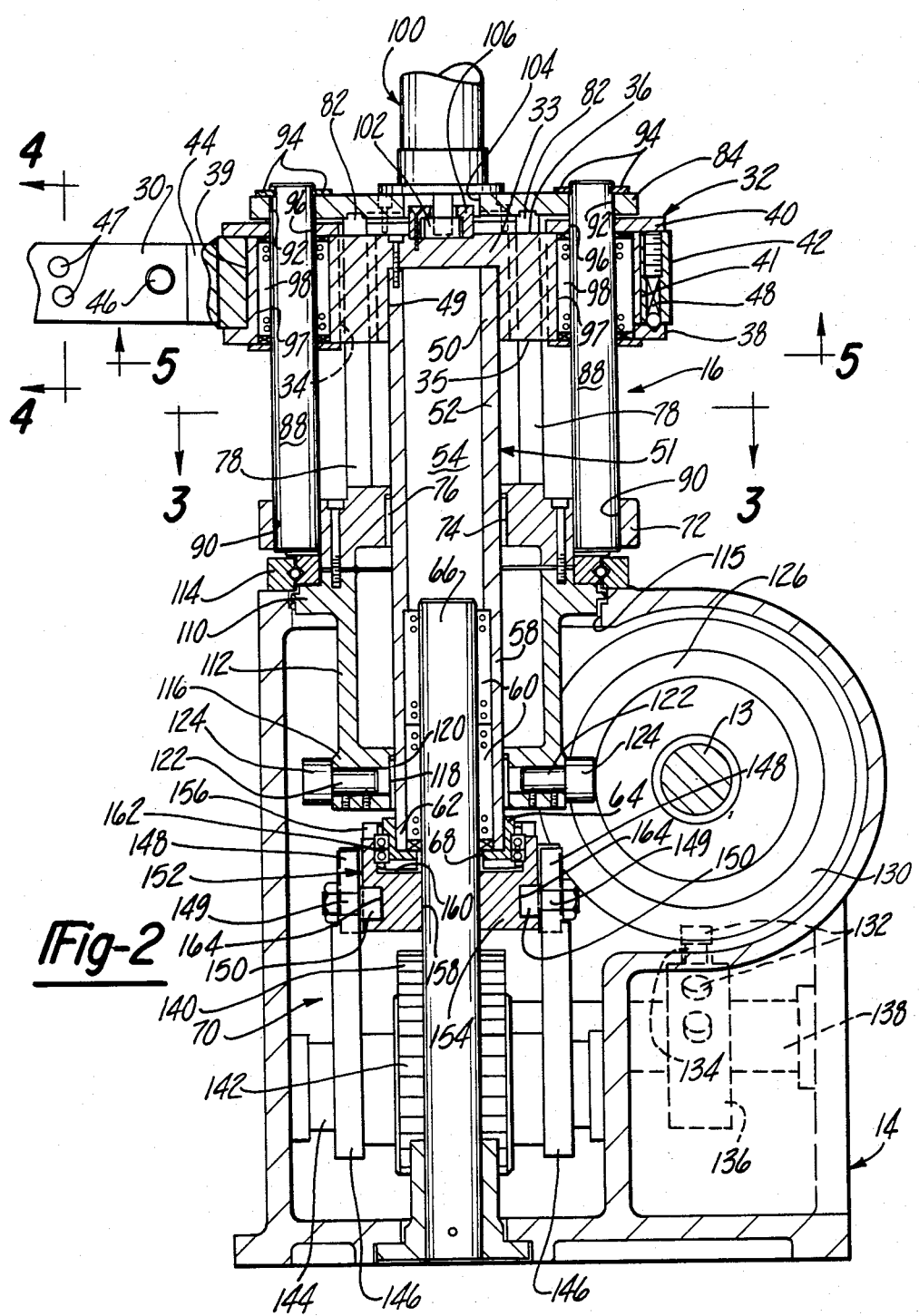
FIG. 2 is an elevational view, with portions shown in cross section, taken generally in the direction of arrow 2 in FIG. 1.
Figure 3:
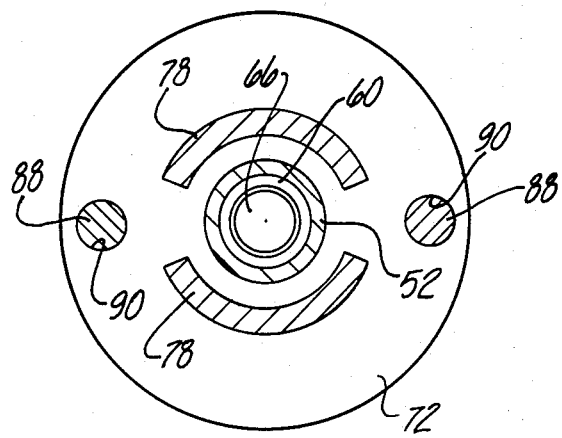
FIG. 3 is a cross sectional view taken along the line 3—3 of FIG. 2.
Figure 4:
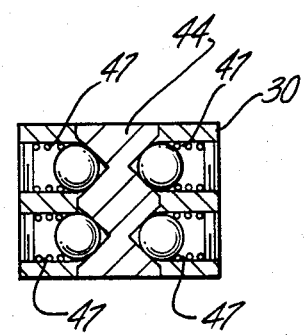
FIG. 4 is a cross sectional view taken along the line 4—4 of FIG. 2.
Figure 5:
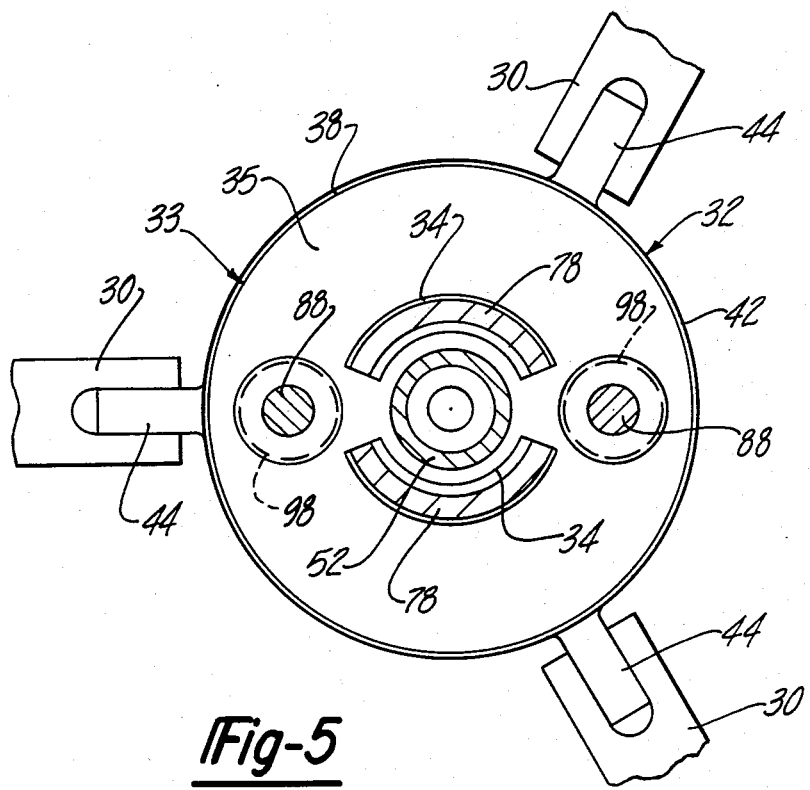
FIG. 5 is a cross sectional view taken along the line 5—5 of FIG. 2.

As shown more fully in FIGS. 2 and 5, the disc assembly 32 includes a unitary disc member 33 which is formed with a pair of circumferentially extending axial slots 34 which communicate between opposite end faces 35 and 36 of disc member 33. The disc member 33 includes a circumferentially extending peripheral sidewall 38 which is formed with a stepped portion 39 that cooperates with an end plate 40 assembled to end face 36 to define a circumferentially extending recess 41. The disc assembly 32 also includes an annular ring portion 42 which is retained for linear movement with disc member 33 and end plate 40 within recess 41. Ring portion 42 is formed with three radially outwardly depending arms 44, each of which is received within the bifurcated portion 30 of a supporting arm 17. The bifurcated portion 30 of each arm 17 is operatively connected with an arm 44 by way of a pivot pin connection 46 and spring loaded ball and detent assemblies 47. The ring portion 42 is operatively connected with the disc member 33 for rotational movement therewith by way of a plurality of spring loaded ball and detent assemblies, one of which is shown at 48. Each of the ball and detent assemblies 47 and 48 operate to provide the device 10 with an overload protection means in a manner described more fully hereinafter.

As shown in FIG. 2, the disc member 33 is formed with an axial cylindrical recess 49 in its lower end face 35 within which the upper end 50 of a drive column 51 is affixed for effecting a driving connection between the drive column 51 and disc assembly 32. The drive column 51 is formed as an elongated hollow cylinder having a cylindrical wall 52 and an axially extending hollow core 54. The cylindrical wall 52 includes a stepped portion 58 in its radially inner face into which a pair of elongated ball bushings 60 are fitted, and terminates in a lower end portion 62 to which a collar assembly 64 is affixed. An axially extending fixed column 66 is secured within housing 14, and is received through a bore or through aperature 68 in collar assembly 64 and within bushings 60 in the manner shown in FIG. 2. The device 10 includes an axial drive assembly 70 which is operatively connected with collar assembly 64 to drive collar assembly 64, drive column 51 and disc assembly 32 in a reciprocating fashion in a direction parallel to the axis of fixed column 66 in a manner described more fully below.

The supporting structure 16 includes a lower supporting plate 72 having an axial bore 74 through which drive column 51 is received. Bore 74 is fitted with a bushing 76 that permits axial movement of drive column 51 relative to lower supporting plate 72. An axially extending hollow cylindrical bifurcated shell 78 extends upwardly from lower supporting plate 72 and is received through slots 34 in disc member 33. Shell 78 terminates in upper ends 82 which are affixed to an upper supporting plate 84 so that the shell 78 cooperates with lower supporting plate 72 and upper supporting plate 84 to define an elongated rigid assembly. The supporting structure 16 also includes a pair of elongated cylindrical pins 88 which are retained in axial bores 90 and 92 in lower supporting plate 72 and upper supporting plate 84, respectively, by way of retaining rings 94. As shown in FIG. 2, these pins 88 are also received through diametrically opposed holes 96 in end plate 40 and aligned axial bores 97 in disc member 33. The bores 97 are fitted with ball bushings 98 that enable axial movement of disc member 33, and thus disc assembly 32, relative to pins 88 and lower and upper plates 72 and 84, respectively. An air spring 100 is affixed to upper supporting plate 84 along the axis of fixed column 66. The air spring 100 includes a piston 102 which extends through an aperature 104 in plate 84 and is operatively connected with disc member 33 by way of a retaining collar 106. This connection enables the air spring 100 to cooperate with axial drive assembly 70 to effect reciprocatory linear movement of disc assembly 32 and drive column 51 in a direction parallel to the axis of fixed column 66, as described more fully hereinafter.

As shown in FIG. 2, the lower supporting plate 72 of the supporting structure 16 is affixed to the upper end 110 of a hollow turntable 112 which in turn is rotatably supported by an anti-friction bearing arrangement 114 within an opening 115 in the upper end of housing 14. The lower end of turntable 112 defines a hub portion 116 having an axial bore 118 through which drive column 51 is received. Bore 118 is fitted with a bushing 120 that enables axial movement of drive column 51 relative to turntable 112. Radially outwardly extending pins 122 are affixed to hub portion 116 and carry roller followers 124 at their outer ends. As described below, the roller followers 124 are adapted to coact with a first barrel cam 126 affixed to camshaft 13 to effect oscillation of turntable 112 about the axis of fixed column 66 as camshaft 13 rotates.

The axial drive assembly 70 includes a second barrel cam 130 that is also affixed to the camshaft 13. This barrel cam 130 is adapted to coact with roller followers 132 which are carried on pins 134 affixed to a follower wheel 136 secured for oscillation with a follower shaft 138 journaled transversely of camshaft 13 in the lower end of housing 14. This arrangement allows follower wheel 136 and follower shaft 138 to be driven through a defined amplitude of oscillation about the axis of follower shaft 138 by the coaction of barrel cam 130 and roller followers 132 as camshaft 13 rotates.

The drive assembly 70 also includes a sector gear transmission which operates to amplify this oscillation in the following manner. A first sector gear 140 is affixed to follower shaft 138 and is thus operative to be driven through the same amplitude of oscillation as follower shaft 138 by the coaction of barrel cam 130 and roller followers 132. A second sector gear 142 is affixed to a pivot shaft 144 which is in turn journaled transversely of camshaft 13 within the lower end of housing 14. This second sector gear 142 is drivingly engaged with the first sector gear 140 so that sector gear 142 and pivot shaft 144 are driven in an oscillatory fashion about the axis of pivot shaft 144 upon oscillation of first sector gear 140 and follower shaft 138. However, the amplitude of oscillation of sector gear 142 and pivot shaft 144 relative to the amplitude of oscillation of sector gear 140 and follower shaft 138 is determined by the relationship of the pitch diameters of sector gears 140 and 142 and can thus be varied as desired. In the preferred embodiment of the invention, the pitch diameter of first sector gear 140 is larger than the pitch diameter of second sector gear 142. This feature enables the amplitude of oscillatory movement of first sector gear 140 and the follower shaft 138 about the axis of follower shaft 138 to be transferred into an enlarged amplitude of oscillatory movement of second sector gear 142 and pivot shaft 144 about the axis of pivot shaft 144.

The axial drive assembly 70 further includes a bifurcated arm assembly 146 which is fixed for oscillatory movement with pivot shaft 144 and which has terminal ends 148 that carry inwardly extending pins 149 upon which are journaled rollers 150. The rollers 150 are operatively connected with a drive collar assembly 152 formed from the assembly of a lower socket portion 154 and an annular upper collar 156. As shown in FIG. 2, the socket portion 154 includes an axial bore or aperature 158 through which the fixed column 66 extends. In addition, the socket portion 154 and the upper collar 156 are formed to cooperatively define a recess 160 within which collar assembly 64 and the lower end 62 of drive column 51 are received. Retained within recess 160 between the drive collar assembly 152 and collar assembly 64 are thrust bearings 162 which permit rotational movement of drive column 51 and collar assembly 64 relative to drive collar assembly 152. The socket portion 154 of drive collar assembly 152 also includes a pair of elongated slots 164 in which rollers 150 are received. The sidewalls of slots 164 are formed to retain rollers 150 against relative movement in a direction parallel to the axis of fixed column 66 and thus permit rollers 150 to exert a driving force upon drive collar assembly 152 which is parallel to the axis of fixed column 66 as arm assembly 146 and pivot shaft 144 oscillate. Through this arrangement, oscillatory movement of pivot shaft 144 and arm assembly 146 is transferred into a reciprocatory driving force for moving drive collar assembly 152, collar assembly 64 and drive column 51 in a direction parallel to the axis of fixed column 66.

With this overall configuration, the material handling device 10 of the present invention can be operated to move a workpiece from a first location to a second location along linear and angular paths in the following manner. (As the operation and function of the three arms 17 and gripping devices 18 are identical, only one arm 17 and its associated elements will be described hereinafter.) FIG. 1 illustrates the mechanism in a home position. In this position, the jaws 20 of gripping device 18 will be opened and a workpiece can be positioned in a first location in proximity to the jaws 20 to be gripped in any suitable fashion. The cylinder 22 is then actuated so as to close the jaws 20 and grip the workpiece. The camshaft 13 is then rotatably driven by motor 12 to enable the drive assembly 70 to operate for lifting the workpiece from this first location. In particular, upon rotation of camshaft 13, barrel cam 130 will rotate and drive followers 132, follower wheel 136, and follower shaft 138 through an amplitude of angular movement about the axis of follower shaft 138. First sector gear 140 will likewise be driven through this amplitude of angular movement and will operate to drive second sector gear 142 and pivot shaft 144 through an enlarged amplitude of angular movement about the axis of pivot shaft 144. Arm assembly 146 will at the same time be driven through this enlarged amplitude of movement about the axis of pivot shaft 144 and force rollers 150 to engage the upper sidewalls of slots 164 and urge drive collar assembly 152, collar assembly 64 and drive column 51 upwardly. During this lifting movement, drive column 51 will move upwardly relative to supporting structure 16 because of its axial journaled relationship with turntable 112 and lower supporting plate 72 of supporting structure 16. On the other hand, since disc member 33 is affixed to the upper end 50 of drive column 51, this upward movement will also effect a raising of the disc assembly 32, supporting arm 17, and gripping device 18 because of the axial journaled relationship of disc member 33 with pins 88 of structure 16. Thus, the workpiece gripped by the gripping device 18 will be raised. The upward or lifting movement will continue until barrel cam 130 reaches its dwell position.

It should be noted that the air spring 100 is designed and situated to provide an auxiliary upward axial force upon disc assembly 32 to assist the axial drive assembly 70 during this workpiece lifting phase. In this connection, when the workpiece is in its first location and the mechanism is in its home position, the arm assembly 146 is situated so that drive column 51 will be at the bottom of its stroke, and the disc assembly 32 will be spaced axially from upper supporting plate 84 and upwardly adjacent lower supporting plate 72. In this position, the piston 102 of air spring 100, which is operatively connected with disc member 33 by way of retaining collar 106, will be fully extended in a downward direction. However, the piston 102 is normally biased toward its retracted position (at the top of the stroke of drive column 51 as shown in FIG. 2) and thus is operative to exert an auxiliary upward biasing force to disc member 33 as drive column 51 moves from the bottom to the top of its stroke along the axis of fixed column 66 during the workpiece lifting phase. The air spring 100 thus reduces the loads placed upon the motor 12, camshaft 13 and drive assembly 70 during the workpiece lifting phase, and is particularly helpful in assisting in lifting heavier workpieces.

As the camshaft 13 rotates and the upward movement of the workpiece is accomplished, barrel cam 126 will be in its dwell position and the supporting arm 17 will be in a first angular position. However, upon continued rotation of the camshaft 13, barrel cam 126 will move out of its dwell position and cause rotation of disc assembly 32, supporting arm 17 and gripping device 18 in the following manner. The face of barrel cam 126 will engage and drive rollers 124, and thus cause turntable 112 and supporting structure 16 to rotate about the axis of fixed column 66. Additionally, since the disc assembly 32 is effectively keyed to the supporting structure 16 by way of pins 88 and the drive column 51 is fixed within recess 49 of disc member 33, disc assembly 32 and drive column 51 will also be rotated about the axis of fixed column 66, and supporting arm 17 and gripping device 18 will rotate from their first angular position to a second angular position.

At the completion of this movement, barrel cam 126 will enter a dwell state. At this point, followers 132 will move out of the dwell portion of barrel cam 130 and barrel cam 130 will commence its driving movement. Arm assembly 146 will then be pivoted and rollers 150 will apply a downward axial force upon drive collar assembly 152 to effect a lowering of drive column 51, disc assembly 32, supporting arm 17 and gripping device 18. At this point, the actuating cylinder 22 can be actuated so as to release the held workpiece from the jaws 20 for deposit of the workpiece at a second location. At the completion of the lowering operation, the face of barrel cam 126 will again engage and drive followers 124 and cause the assembly to rotate in the opposite direction about the axis of fixed column 66 so that supporting arm 17 and gripping device 18 will be rotated back to their home position. It should be noted that any desired path of movement may be achieved with this mechanism depending upon the configuration of barrel cams 126 and 130. Furthermore, the opening and closing of the jaws 20 and, if desired, starting and stopping of the motor 12, may be controlled in any known manner through the use of limit switches.

The material handling device 10 is provided with overload release means if a supporting arm 17 and/or gripping device 18 happens to strike an obstacle during either linear and/or rotational movement. In this connection, the device 10 is provided with the previously-noted spring loaded ball and detent assemblies 47 in the connection between arms 44 and the bifurcated portions 30 of supporting arms 17. These assemblies 47 allow for pivotal deflection of arms 17 if they are subjected to a loading beyond a threshold point, and thus protect the axial drive assembly 70 and associated linear driving elements if a supporting arm 17 and/or its associated parts strike an obstacle during linear movement. On the other hand, similar overload protection during rotational movement is afforded by way of spring loaded ball and detent assemblies 48. These assemblies 48 enable rotational movement of disc member 33 and the associated rotational driving elements relative to ring portion 42, arms 44, arms 17 and gripping devices 18 if either an arm 17 and/or its associated parts strike an obstacle during rotational movement.

As is readily apparent, the material handling device 10 of the present invention possesses distinct advantages in applications requiring large linear movement of a workpiece. In this connection, the provision of sector gears 140 and 142 in the axial drive assembly 70 enables the amplitude of oscillation of follower shaft 138 to be multiplied to yield an enlarged amplitude of angular movement of pivot shaft 144, which in turn allows arm assembly 146 to be driven through a larger range of movement than otherwise possible with the predetermined profile and cycle of barrel cam 130 and length of arm assembly 146. It therefore allows for the achievement of large linear workpiece movement with an axial drive assembly 70 having a more compact cam and follower arrangement and/or arm assembly 146, and thus allows for a drive mechanism and housing of a more compact and reduced size than otherwise possible. As is readily apparent, the degree of motion amplification achieved by the sector gears 140 and 142 is determined by the ratio of the pitch diameters of sector gear 140 and 142, and can be varied as desired.

It is understood that the foregoing description is that of the preferred embodiment of the invention and that various changes and modifications may be made thereto without departing from the spirit and scope of the invention, as defined in the appended claims.

What is claimed is:

1. A material handling device for moving a workpiece along first and second paths to effect movement of the workpiece from a first location to a second location, said device comprising gripping means for gripping a workpiece to be moved, a first cam and follower arrangement for generating a defined amplitude of movement in a first degree of freedom, first motion transfer means operatively connected with said first cam and follower arrangement for transferring movement in said first degree of freedom into movement of said gripping means along said first path, a second cam and follower arrangement for generating a defined amplitude of movement in a second degree of freedom, second motion transfer means operatively connected with said second cam and follower arrangement for transferring movement in said second degree of freedom into movement of said gripping means along said second path, and transmission means interposed in the operative connection of one of said cam and follower arrangements and the motion transfer means operatively associated therewith for effecting a multiplication of the amplitude of movement in the degree freedom generated by that cam and follower arrangement to yield a different amplitude of output movement in the same degree of freedom for transfer by the associated motion transfer means into movement of said gripping means along one of said paths, said transmission means receiving a defined amplitude of oscillation about a first axis as an input movement from the associated cam and follower arrangement and generating a different amplitude of oscillation about a second axis as an output movement and comprising a sector gear assembly having a first sector gear supported for oscillation about said first axis and a second sector gear supported for oscillation about said second axis and drivingly engaged with said first sector gear.

2. A material handling device as set forth in claim 1 wherein the pitch diameter of said first sector gear is greater than the pitch diameter of said second sector gear.

3. A material handling device for moving a workpiece along first and second paths to effect movement of the workpiece from a first location to a second location, said device comprising gripping means for gripping a workpiece to be moved, a first cam and follower arrangement for generating a defined amplitude of movement in a first degree of freedom, first motion transfer means operatively connected with said first cam and follower arrangement for transferring movement in said first degree of freedom into movement of said gripping means along said first path, a second cam and follower arrangement for generating a defined amplitude of movement in a second degree of freedom, second motion transfer means operatively connected with said second cam and follower arrangement for transferring movement in said second degree of freedom into movement of said gripping means along said second path, and transmission means interposed in the operative connection of one of said cam and follower arrangements and the motion transfer means operatively associated therewith for effecting a multiplication of the amplitude of movement in the degree freedom generated by that cam and follower arrangement to yield a different amplitude of output movement in the same degree of freedom for transfer by the associated motion transfer means into movement of said gripping means along one of said paths, said first motion transfer means transfers movement in said first degree of freedom into oscillatory movement of said gripping means about a first axis, said second motion transfer means transfers movement in said second degree of freedom into reciprocating movement of said gripping means in a direction parallel to said first axis, and said transmission means multiplies the amplitude of movement in said second degree of freedom generated by said second cam and follower arrangement to yield an output movement in said second degree of freedom for transfer by said second motion transfer means to said gripping means, said transmission means comprising a sector gear assembly having a first sector gear operatively connected with said second cam and follower arrangement and operative to be driven by said second cam and follower arrangement in an oscillatory manner about a follower axis, and a second sector gear drivingly engaged by said first sector gear and operative to be driven by said first sector gear in an oscillatory manner about an axis disposed parallel to said follower axis to yield said output movement.

4. A material handling device as set forth in claim 3 wherein said follower axis is disposed transverse to said first axis.

5. A material handling device as set forth in claim 3 wherein said first sector gear has a pitch diameter which is greater than the pitch diameter of said second sector gear.

6. A material handling device for moving a workpiece comprising gripping means for selectively gripping a workpiece to be moved, supporting means for supporting movement of said gripping means along a linear path, a camshaft supported for rotation, a cam affixed for rotation with said camshaft, a follower supported for oscillation about a first axis disposed transversely to the axis of said camshaft and engaged with said cam for oscillation about said first axis upon rotation of said camshaft, motion transfer means which transfers oscillatory movement into movement of said gripping means along said linear path, and transmission means operatively interconnecting said follower and said motion transfer means and which receives the oscillation of said follower as an input movement and transfers to said motion transfer means an output oscillatory movement having am amplitude which is different from the amplitude of said input movement, said transmission means comprising a first sector gear supported for oscillation about said first axis and drivingly engaged with a second sector gear affixed for oscillation with a pivot shaft having an axis which is parallel to said first axis, and said motion transfer means includes an elongated pivot arm with one end of said pivot arm being affixed for oscillation with said pivot shaft.

7. A material handling device as set forth in claim 6 wherein said first sector gear has a pitch diameter greater than the pitch diameter of said second sector gear.

8. A material handling device as set forth in claim 6 further comprising an overload release means in said motion transfer means for permitting movement of said cam, said follower and said transmission means without accompanying movement of said gripping means if said gripping means strikes an obstacle.

* * * * *